(12) United States Patent
Tsai (10) Patent No.: US 9,142,979 B2
(45) Date of Patent: Sep. 22, 2015

(54) ACTIVE BALANCING CIRCUIT FOR BALANCING BATTERY UNITS

(71) Applicant: Fu-Sheng Tsai, Taoyuan County (TW)

(72) Inventor: Fu-Sheng Tsai, Taoyuan County (TW)

(73) Assignee: Fu-Sheng Tsai, Taoyuan Dist., Taoyuan (TW)

( * ) Notice: Subject to any disclaimer, the term of this patent is extended or adjusted under 35 U.S.C. 154(b) by 162 days.

(21) Appl. No.: 13/940,231

(22) Filed: Jul. 11, 2013

(65) Prior Publication Data

US 2014/0015473 A1 Jan. 16, 2014

Related U.S. Application Data

(60) Provisional application No. 61/671,099, filed on Jul. 13, 2012.

(51) Int. Cl.
*H02J 7/00* (2006.01)
*G06F 17/50* (2006.01)

(52) U.S. Cl.
CPC ........... *H02J 7/0014* (2013.01); *G06F 17/5009* (2013.01); *H02J 7/0016* (2013.01); *H02J 7/0042* (2013.01); *G06F 2217/78* (2013.01)

(58) Field of Classification Search
CPC ....... H02J 7/0016; H02J 7/0042; H02J 7/025; H02J 17/00; H02J 5/005; H02J 7/0004; H02J 9/02; H02J 9/065; H02J 1/102; H02J 3/383; H02J 7/35; H02J 3/18; H02J 3/385; H02J 3/387; H02J 7/0019
USPC ................................................. 320/100–108
See application file for complete search history.

(56) References Cited

U.S. PATENT DOCUMENTS

2007/0279003 A1* 12/2007 Altemose et al. ............. 320/118
2008/0185994 A1* 8/2008 Altemose ...................... 320/118

* cited by examiner

*Primary Examiner* — Binh Tat
(74) *Attorney, Agent, or Firm* — Winston Hsu; Scott Margo (57) ABSTRACT

A balancing circuit for balancing battery units includes balancing modules. Each of the balancing modules includes a first and a second switch unit, and a first and a second inductive device, wherein the first inductive device is coupled to the second inductive device. The balancing modules include a first and a second balancing module, respectively coupled to a first and a second battery unit of the battery units. The first inductive device of the first balancing module takes away an excess energy of the first battery unit according to a switch state of the first switch unit of the first balancing module, and stores an inductive energy corresponding to the excess energy in the second balancing module. The second inductive device of the second balancing module provides the inductive energy for the second battery unit according to a switch state of the second switch unit of the second balancing module.

18 Claims, 6 Drawing Sheets

ACTIVE BALANCING CIRCUIT FOR BALANCING BATTERY UNITS

CROSS REFERENCE TO RELATED APPLICATIONS

This application claims the benefit of U.S. provisional application No. 61/671,099, filed on Jul. 13, 2012, the contents of which are incorporated herein by reference.

BACKGROUND OF THE INVENTION

1. Field of the Invention

The disclosed embodiments of the present invention relate to cell balancing, and more particularly, to an active balancing circuit for balancing battery units by providing the battery units with energy of battery unit(s) having higher voltage(s) in the battery units.

2. Description of the Prior Art

In order to supply a higher output voltage, a plurality of batteries may be coupled in series as a power supply to provide the required output voltage. However, when the power supply having the series-connected batteries is charged, voltage unbalance between the batteries will lower the total energy or damage the power supply. For example, when a part of the batteries in the power supply are fully charged and the rest of the batteries need a period of time to complete charging, continuing charging the power supply may lead to overcharging of the part of the batteries, thereby shortening the life of the part of the batteries.

A conventional power supply uses a passive battery balancing mechanism to prevent overcharging. The passive battery balancing mechanism, however, consumes excess energy (i.e. overcharge energy), resulting in energy waste and excess heat. Thus, an active balancing circuit is needed to solve the above problems.

SUMMARY OF THE INVENTION

It is therefore one objective of the present invention to provide an active balancing circuit, which balances battery units by providing the battery units with energy of battery unit(s) having higher voltage(s) in the battery units, to solve the above problems.

According to an embodiment of the present invention, an exemplary balancing circuit for balancing battery units is disclosed. The exemplary balancing circuit comprises a plurality of balancing modules. The balancing modules are coupled to the balancing units, respectively, wherein each balancing module comprises a first switch unit, a second switch unit, a first inductive device and a second inductive device. The first inductive device is coupled between the first switch unit and a battery unit coupled to the balancing module. The second inductive device is coupled to the second switch unit, wherein the first inductive device is coupled to the second inductive device. The balancing modules comprises a first balancing module and a second balancing module, respectively coupled to a first battery unit and a second battery unit of the battery units. The first inductive device of the first balancing module takes away an excess energy of the first battery unit according to a switch state of the first switch unit of the first balancing module, and stores an inductive energy corresponding to the excess energy in the second balancing module. The second inductive device of the second balancing module provides the inductive energy for the second battery unit according to a switch state of the second switch unit of the second balancing module.

The proposed battery balancing circuit may balance a battery system rapidly, and have a modular architecture to simplify the circuit design and increase the design flexibility. Additionally, the proposed battery balancing circuit may use a free-running oscillator to simplify the control mechanism and reduce the cost.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

Figure 1:
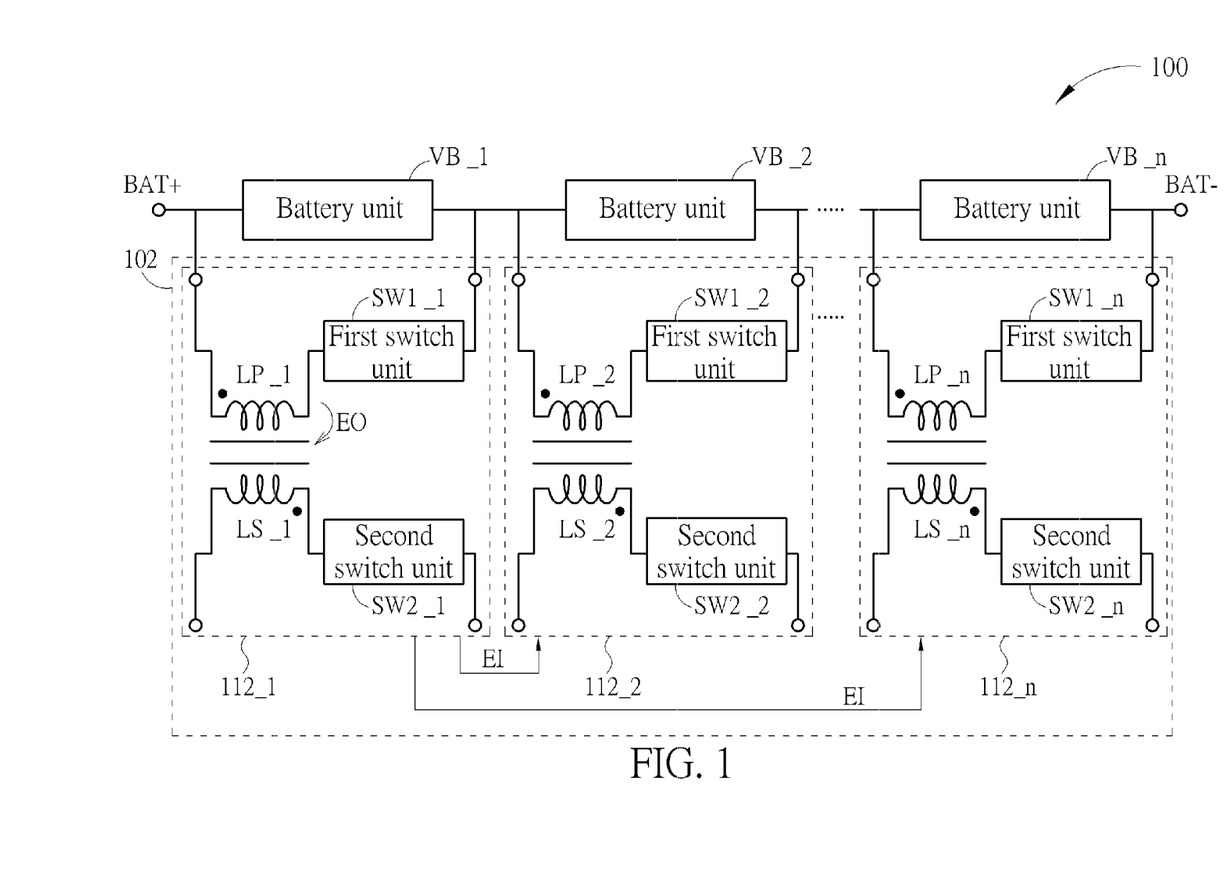
FIG. 1 is an exemplary battery system according to an embodiment of the present invention.

Please refer to FIG. 1, which is an exemplary battery system according to an embodiment of the present invention. The battery system 100 may include a plurality of battery units VB_1-VB_n (n is a positive integer) and a balancing circuit 102 operative for balancing the battery units VB_1-VB_n. The battery units VB_1-VB_n may provide required power for an externally coupled electronic apparatus (not shown in FIG. 1) from a node BAT+ and a node BAT−, or receive charging power from the node BAT+ and the node BAT−. When the battery system 100 operates in a charging mode, an idle mode or a discharging mode, the balancing circuit 102 may extract energy of battery unit(s) having higher voltage(s) (i.e. more charges) in the battery units VB_1-VB_n, and then provide the energy for at least one of the battery units VB_1-VB_n to thereby realize battery balancing. In other words, the balancing circuit 102 is an active balancing circuit, which may realize a rapid and high-efficiency battery balancing mechanism by providing energy for battery unit(s) having lower voltage(s) directly.

Specifically, the balancing circuit 102 may include, but is not limited to, a plurality of balancing modules 112_1-112_n, which are coupled to the balancing unit VB_1-VB_n, respectively. As shown in FIG. 1, the balancing modules 112_1-112_n include a plurality of first switch units SW1_1-

SW1_n, a plurality of second switch units SW2_1-SW2_n, a plurality of first inductive devices LP_1-LP_n and a plurality of second inductive devices LS_1-LS_n. In each balancing module, the first inductive device is coupled between the first switch unit and a battery unit which is coupled to the balancing module, and the second inductive device is coupled to the second switch unit and inductively coupled to the first inductive device. The following assumes that the battery unit VB_1 has an excess voltage (e.g. the voltage of the battery unit VB_1 exceeds a maximum rated voltage, or a voltage difference between the battery unit VB_1 and other battery units is too great) to describe the operation of the balancing circuit 102.

Firstly, the first inductive device LP_1 may take away an excess energy EO of the battery unit VB_1 according to a switch state of the first switch unit SW1_1, and store an inductive energy EI corresponding to the excess energy EO in at least one balancing module. By way of example but not limitation, the first inductive device LP_1 may couple the excess energy EO to each balancing module in order to store the inductive energy EI in each balancing module. Additionally, the first inductive device LP_1 may also couple the excess energy EO to the second inductive device LS_1 to generate the inductive energy EI, thereby storing the inductive energy EI in each balancing module. Next, if a voltage of the battery unit VB_2 is too low, the second inductive device LS_2 of the balancing module 112_2 may provide the inductive energy EI for the battery unit VB_2 according to a switch state of the second switch unit SW2_2. In brief, the proposed battery balancing mechanism uses a switch unit of a balancing module (e.g. the first switch unit SW1_1) to release an energy of a battery unit which is coupled to the balancing module, and uses another switch unit of another balancing module (e.g. the second switch unit SW2_2) to provide the released energy for another battery unit which is coupled to the another balancing module. Please note that the proposed battery balancing mechanism may provide an excess energy of a single battery unit for a plurality of battery units, provide excess energies of a plurality of battery units for a single battery unit, or provide excess energies of a plurality of battery units for a plurality of battery units.

Each of the battery units VB_1-VB_n shown in FIG. 1 may be a battery cell (i.e. a single battery), a battery block (i.e. including parallel-connected batteries), a battery module (i.e. including parallel-connected battery blocks) or a battery pack (i.e. including series-connected batteries and parallel-connected batteries). As architectures of the balancing modules 112_1-112_n shown in FIG. 1 may be identical/similar, the balancing circuit 102 may be implemented in a modular manner.

Figure 2:
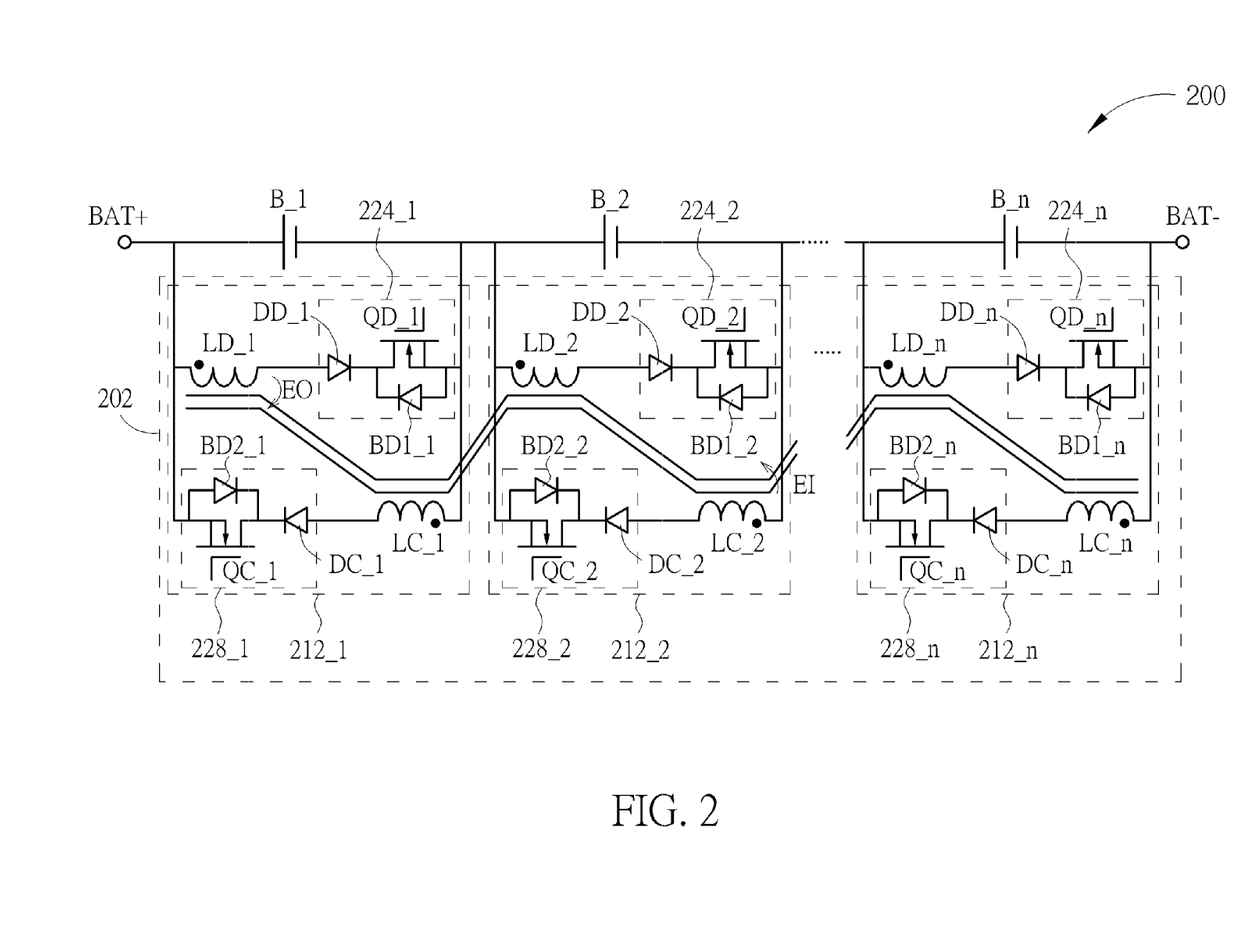
FIG. 2 is a first implementation of the battery system shown in FIG. 1.

Please refer to FIG. 2, which is a first implementation of the battery system 100 shown in FIG. 1. In this implementation, the battery system 200 includes a plurality of battery units B_1-B_n and a balancing circuit 202. By way of example but not limitation, the battery units B_1-B_n may be a plurality of battery cells. The battery units B_1-B_n are connected in series between the node BAT+(i.e. a high side terminal) and the node BAT− (i.e. a low side terminal), and may provide power or receive charging power from the node BAT+ and the node BAT−. The balancing circuit 202 includes a plurality of balancing modules 212_1-212_n, which include a plurality of first inductive devices LD_1-LD_n, a plurality of second inductive devices LC_1-LC_n, a plurality of first switch units 224_1-224_n and a plurality of second switch units 228_1-228_n. In each balancing module, the first inductive device is coupled between the first switch unit and a battery unit which is coupled to the balancing module, and the second inductive device is coupled between the second switch unit and the battery unit.

In this implementation, the first switch units SW1_1-SW1_n shown in FIG. 1 may be implemented by the first switch units 224_1-224_n. The first switch units 224_1-224_n are unidirectional switch devices, which are implemented by a plurality of diodes DD_1-DD_n and a plurality of bidirectional devices (i.e. a plurality of transistors QD_1-QD_n having a plurality of body diodes BD1_1 and BD1_n) coupled in series with the diodes DD_1-DD_n. By way of example but not limitation, at least one of the transistors QD_1-QD_n may be implemented by a metal-oxide-semiconductor field-effect transistor (MOSFET). Similarly, the second switch units SW2_1-SW2_n shown in FIG. 1 may be implemented by the second switch units 228_1-228_n. The second switch units 228_1-228_n are also unidirectional switch devices, which are implemented by a plurality of diodes DC_1-DC_n and a plurality of bidirectional devices (i.e. a plurality of transistors QC_1-QC_n having a plurality of body diodes BD2_1 and BD2_n) coupled in series with the diodes DC_1-DC_n. At least one of the transistors QC_1-QC_n may also be implemented by a MOSFET.

As shown in FIG. 2, the first inductive device is coupled to the second inductive device in each balancing module. In addition, the first inductive devices of different balancing modules are coupled to each other, and the second inductive devices of different balancing modules are coupled to each other. In other words, the inductive devices (i.e. the first inductive devices LD_1-LD_n and the second inductive devices LC_1-LC_n) are coupled to each other. Hence, when a balancing module of the balancing modules 212_1-212_n takes away an excess energy from a battery unit coupled to the balancing module, all the rest of the balancing modules may store an inductive energy corresponding to the excess energy.

Consider the case where a voltage of the battery unit B_1 is too high (e.g. the voltage of the battery unit B_1 exceeds a maximum rated voltage, or a voltage difference between the battery unit B_1 and other battery units is too great) while a voltage of the battery unit B_2 is too low (e.g. the voltage of the battery unit B_2 is lower than a minimum rated voltage, or the voltage of the battery unit B_2 is much lower than other battery units). When the first switch unit 224_1 (or the transistor QD_1) switches from a turn-off state to a turn-on state, an excess energy EO of the battery unit B_1 may be taken away and transformed into an inductive energy EI due to the coupling between the first inductive device LD_1 and other inductive devices, wherein the inductive energy EI may be stored in the other inductive devices (i.e. a magnetic core). Next, the switch unit 228_2 (or the transistor QC_2) may be switched from the turn-off state to the turn-on state. Once the first switch unit 224_1 switches back to the turn-off state, the inductor energy EI stored in the second inductive device LC_2 may be provided for the battery unit B_2.

In view of the above, when a voltage of the battery unit B_x (1≤x≤n) is too high, the first switch unit 224_x (or the transistor QD_x) may turn on to release an excess energy (e.g. the excess energy EO), and store a corresponding inductive energy (e.g. the inductive energy EI). Next, the second switch unit 228_y (or the transistor QC_y) (1≤y≤n) may turn on to provide the inductive energy for the battery unit B_y (i.e. a battery unit having a lower voltage). In other words, turning on the transistor QD_x may be regarded as discharging the battery unit B_x, and turning on the transistor QC_y may be regarded as charging the battery unit B_y.

Figure 3:
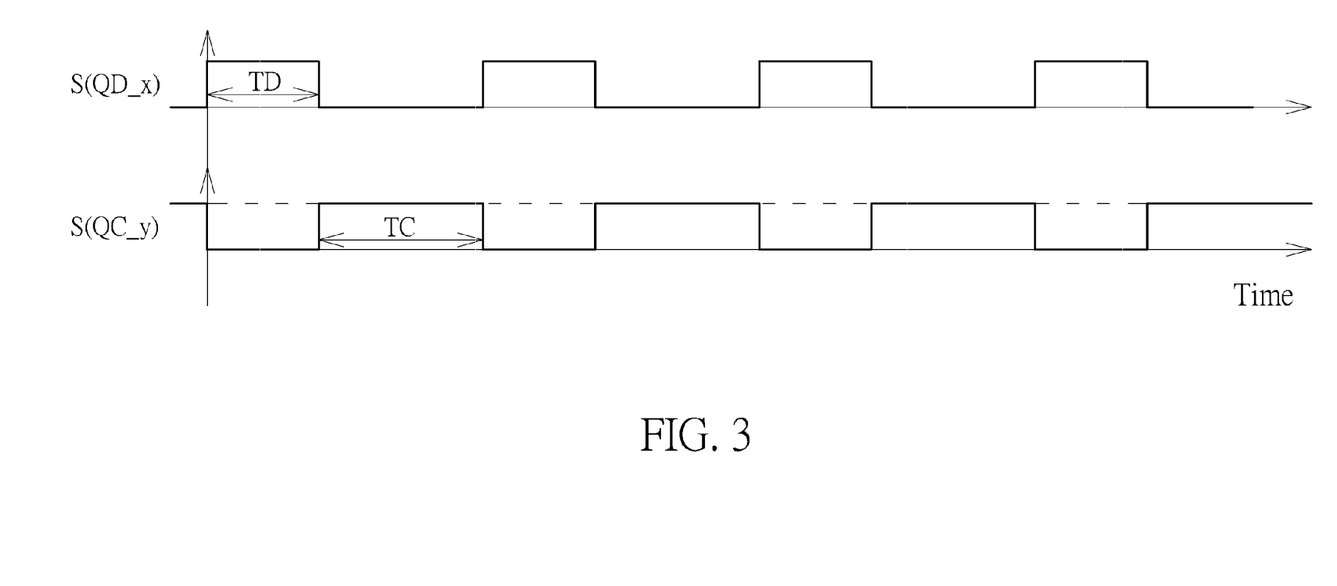
FIG. 3 is a diagram illustrating a switching sequence of the transistors shown in FIG. 2.

A switching sequence of the switch units shown in FIG. 2 is illustrated in FIG. 3. FIG. 3 is a diagram illustrating a switching sequence of the transistors shown in FIG. 2, wherein the transistor QD_x represents one of the transistors QD_1-QD_n (corresponding to the first switch unit 224_x) and the transistor QC_y represents one of the transistors QC_1-QC_n (corresponding to the second switch unit 228_y). When the transistor QC_y is in the turn-on state (e.g. a signal S(QC_y) is at a high level) and the transistor QD_x switches back to the turn-off state (e.g. a signal S(QD_x) switches form the high level to a low level), the inductive energy stored in the magnetic core may be provided for a battery unit corresponding to the transistor QC_y. Therefore, in order to provide the inductive energy for the battery unit corresponding to the transistor QC_y, the transistor QC_y may turn on at the same time as the transistor QD_x turns off (as shown in FIG. 3). That is, the second switch unit 228_y may turn on at the same time as the first switch unit 224_x turns off. In an alternative design, the transistor QC_y may turn on before the transistor QD_x turns off. For example, the transistor QC_y and the transistor QD_x may turn on simultaneously.

By setting appropriate duty cycles of signals used to drive the transistors QD_x and the QC_y, the inductor energy stored in the magnetic core may be completely released to avoid the saturation of the magnetic core. For example, conduction time of the transistor QC_y after the transistor QD_x turns off (e.g. a time period TC) may be set to be longer than conduction time of the transistor QD_x (e.g. a time period TD). In one implementation, in order to completely release the inductor energy stored in the magnetic core, a turn ratio between the first inductive device and the second inductive device may be set appropriately to be used in conjunction with the duty cycle setting.

Figure 4:
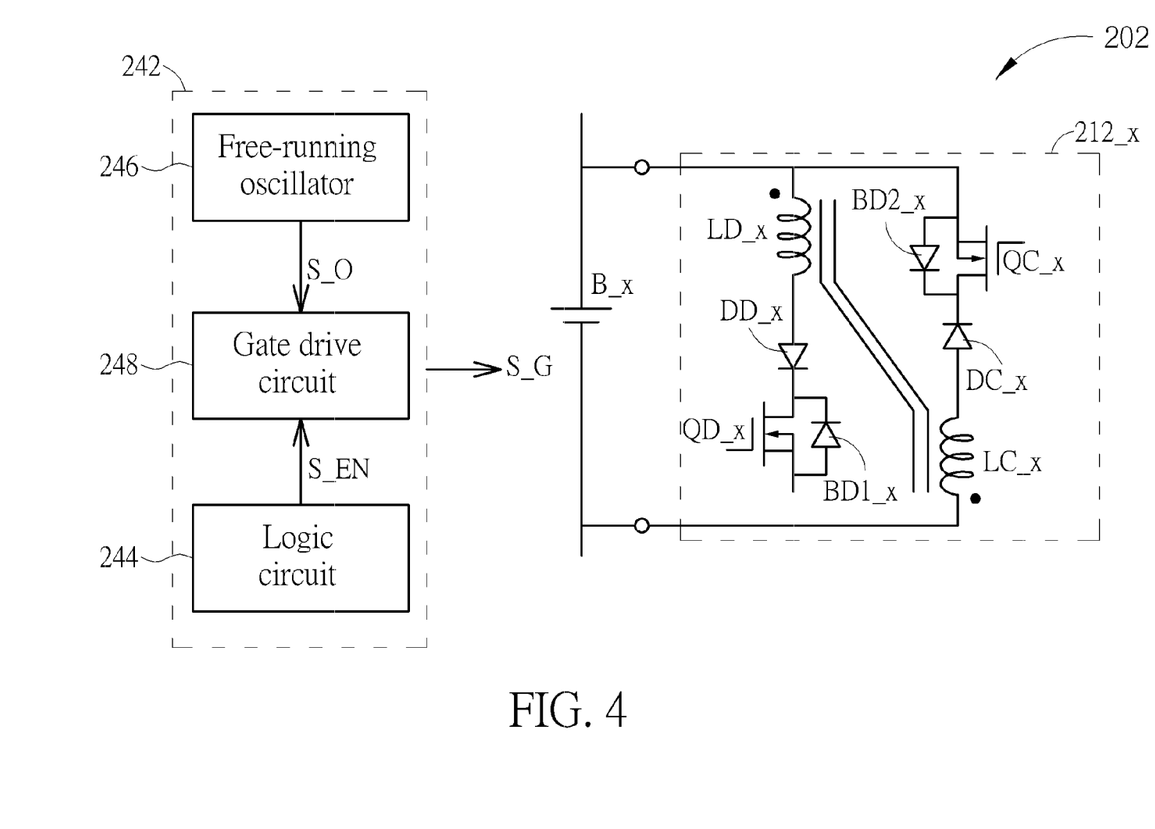
FIG. 4 is a diagram illustrating an implementation of a partial circuit of the balancing circuit shown in FIG. 2.

The switch state of the aforementioned switch unit may be controlled by a control unit. Please refer to FIG. 4 in conjunction with FIG. 2. FIG. 4 is a diagram illustrating an implementation of a partial circuit of the balancing circuit 202 shown in FIG. 2. In this implementation, the balancing circuit 202 further includes a control unit 242, which is arranged to generate a driving signal S_G to control an operation of the balancing module 212_x corresponding to the battery unit B_x. The first inductive device LD_x, the second inductive device LC_x, a plurality of diodes DD_x and DC_x, a transistor QD_x (having a body diode BD1_x) and a transistor QC_x (having a body diode BD2_x) are circuit elements included in the balancing module 212_x. The control unit 242 includes a logic circuit 244, a free-running oscillator 246 and a gate drive circuit 248. As the free-running oscillator 246 may self-oscillates, the control unit 242 has the advantage of simplifying the circuit design and reducing the cost. More specifically, the logic circuit 244 may detect voltages of the battery units B_1-B_n to obtain voltage information, and generate an enable signal S_EN according to the voltage information. The gate drive circuit 248 may generate the driving signal S_G according to the enable signal S_EN and an oscillation signal S_O generated by the free-running oscillator 246 in order to control switch state of the transistor(s) (e.g. the transistor QD_x and/or the transistor QC_x).

For example, when the logic circuit 244 detect that the voltages of the battery units B_1-B_n are unbalanced, the enable signal S_EN may have a specific voltage level (e.g. a high level), and the gate drive circuit 248 may generate the driving signal S_G according to the oscillation signal S_O. That is, the driving signal S_G may include frequency and duty cycle information of the oscillation signal S_O. An amount of energy released (or received) from the battery unit B_x may be controlled by the frequency and the duty cycle of the oscillation signal S_O.

Please note that above is for illustrative purposes only, and is not meant to be a limitation of the present invention. In one implementation, at least one (e.g. more than one) battery unit may turn on simultaneously to release the excess energy, which will be stored in each balancing module, and the corresponding inductive energy may be provided for at least one (e.g. more than one) batter unit simultaneously. In addition, the architecture of the control unit 242 shown in FIG. 4 is for illustrative purposes. For example, the free-running oscillator 246 may directly refer to the enable signal S_EN to output the oscillation signal S_O as the driving signal S_G. In an alternative design, the gate drive circuit 248 may directly refer to the enable signal S_EN to generate the driving signal S_G.

Figure 5:
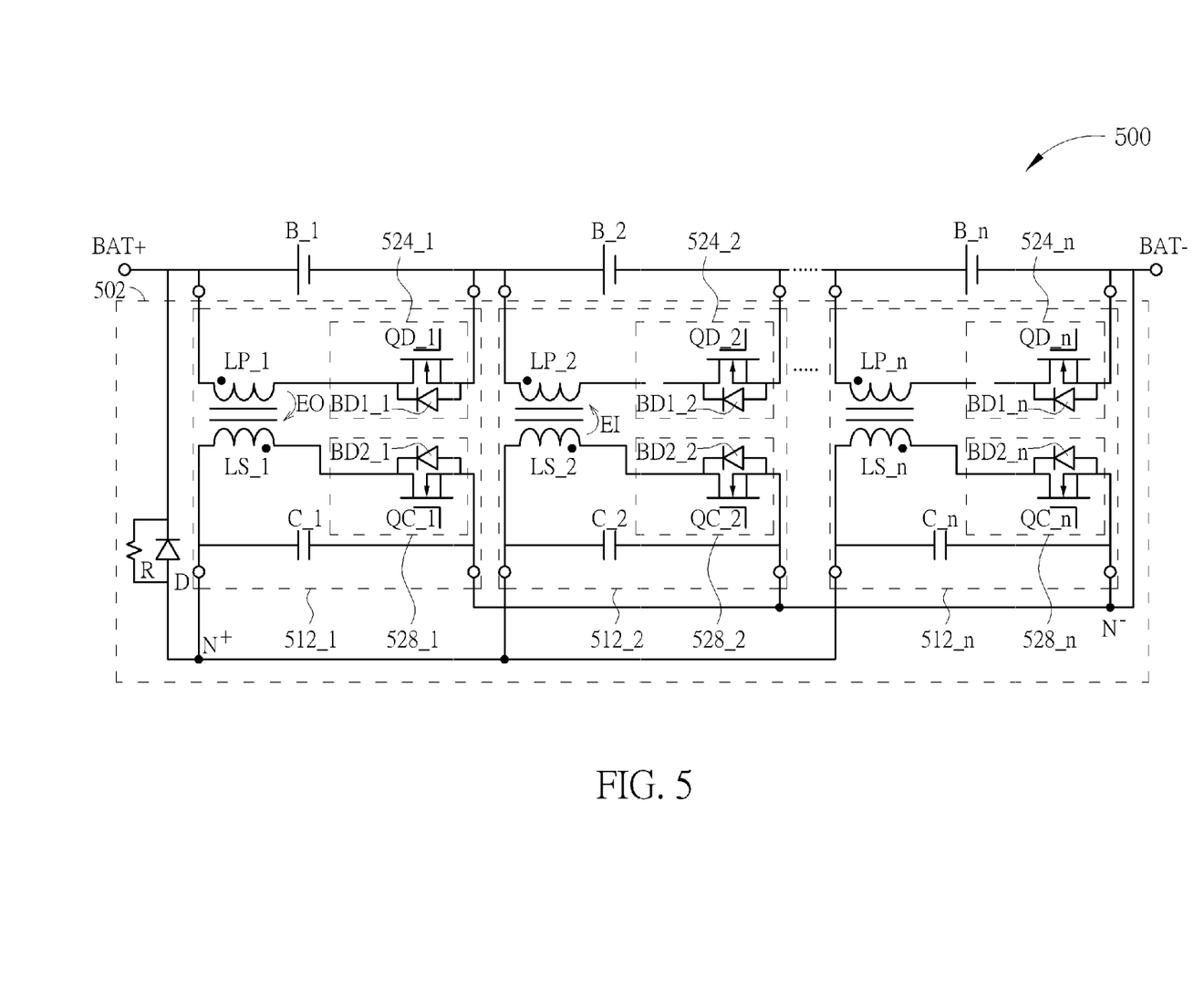
FIG. 5 is a second implementation of the battery system shown in FIG. 1.

Please refer to FIG. 5, which is a second implementation of the battery system 100 shown in FIG. 1. In this implementation, the battery system 500 includes the battery units B_1-B_n shown in FIG. 2 and a balancing circuit 502. The balancing circuit 502 includes a plurality of balancing modules 512_1-512_n, which include the first inductive devices LP_1-LP_n and the second inductive devices LS_1-LS_n shown in FIG. 1, a plurality of first switch units 524_1-524_n, a plurality of second switch units 528_1-528_n and a plurality of capacitors C_1-C_n. In each balancing module, the first inductive device is coupled between the first switch unit and a battery unit which is coupled to the balancing module, the second inductive device is coupled between the second switch unit, and two terminals of the capacitor of the balancing module are coupled to the second inductive device and the second switch unit, respectively.

In this implementation, the first switch units 524_1-524_n may be implemented by the transistors QD_1-QD_n shown in FIG. 2, and the second switch units 528_1-528_n may be implemented by the transistors QC_1-QC_n shown in FIG. 2. The capacitors C_1-C_n are connected in parallel between the node N+ and the node N− (i.e. the node BAT−). When a balancing module of the balancing modules 512_1-512_n takes away an excess energy from the battery unit coupled to the balancing module, all the rest of the balancing modules may store an inductive energy corresponding to the excess energy.

Consider the case where the voltage of the battery unit B_1 is too high (e.g. the voltage of the battery unit B_1 exceeds a maximum rated voltage, or a voltage difference between the battery unit B_1 and other battery units is too great) while the voltage of the battery unit B_2 is too low (e.g. the voltage of the battery unit B_2 is lower than a minimum rated voltage, or the voltage of the battery unit B_2 is much lower than other battery units). When the transistor QD_1 switches from a turn-off state to a turn-on state, an excess energy EO of the battery unit B_1 may be taken away and transformed into an inductive energy EI due to the coupling between the first inductive device LP_1 and the second inductive device LS_1, wherein the inductive energy EI may be stored the magnetic core, and stored in the parallel-connected capacitors C_1-C_n when the transistor QD_1 switches to the turn-off state. Next, when the transistor QC_2 switches from the turn-off state to the turn-on state, the inductor energy EI stored in the capacitor C_2 may be provided for the battery unit B_2 due to the coupling between the first inductive device LP_2 and the second inductive device LS_2.

Once a second switch unit of at least one balancing module turns on, an inductive energy may be provided for a battery unit coupled to the least one balancing module because the inductive energy is stored in the capacitor of each balancing module. Additionally, it is feasible to turn on the first switch unit (e.g. the transistor QD_x) and the second switch unit (e.g. the transistor QC_y) simultaneously. In brief, during the operation of the battery system 500, the balancing circuit 502 may perform battery balancing at an arbitrary point in time. As turning on the transistor QD_x (1≤x≤n) may be regarded as discharging the battery unit B_x, and turning on the transistor QC_y (1≤y≤n) may be regarded as charging the battery unit B_y, the architecture of the balancing circuit 502 may be employed in a battery system operating in a charging mode, a discharging mode or an idle mode.

In addition, setting an appropriate duty cycle of a signal used to drive the transistor and/or setting an appropriate turn ratio between the first inductive device and the second inductive device may prevent stored energy from saturating the capacitor. The control mechanism of the switch units of the balancing circuit 502 may employ the architecture of the control unit 242 shown in FIG. 4 in order to control the amount of energy released (or received) from the battery unit.

The balancing circuit 502 may further include an impeditive element (i.e. a resistor R in this embodiment) and a diode D, wherein both the resistor R and the diode D are coupled between the node BAT+ and the node N+. Each of the capacitors C_1-C_n is electrically connected to the node BAT+ through the resistor R/the diode D. One advantage is that each of the capacitors C_1-C_n may be pre-charged though the resistor R (or the impeditive element), and undesired surge current will not be generated during the operation of the balancing circuit 502. In other words, the balancing circuit 502 need not employ a soft start mechanism to eliminate/reduce the surge current, thereby simplifying the circuit design and reducing the cost. Additionally, pre-charging the capacitors C_1-C_n may enhance the speed of the circuit operation, and the diode D may also be arranged to eliminate/reduce the surge current.

When the diode D conducts, the node BAT+ and the node N+ may be regarded as being at equal potential. As the capacitors C_1-C_n are connected in parallel between the node N+ and the node BAT-, the capacitors C_1-C_n may be regarded as being connected in parallel between the node BAT+ and the node BAT-. Hence, energies stored in the capacitors C_1-C_n may circulate therebetween and be provided for all battery units, thereby improving the balancing efficiency and avoiding excess voltages across the capacitors C_1-C_n.

Please note that the above is for illustrative purposes only, and is not meant to be a limitation of the present invention. In an alternative design, it is feasible to omit at least one of the resistor R and the diode D. In another alternative design, the capacitors C_1-C_n may be replaced by other types of energy storage devices.

The proposed balancing circuit may be employed in a high voltage (e.g. higher than 400 volts) battery system or a low voltage (e.g. 20 volts) battery system. In high voltage applications, voltage endurance of circuit elements in the balancing circuit will be increased in order to maintain the normal operation of the battery system. In addition, the normal operation of the battery system may also be maintained by adding an energy adjustment circuit rather than increasing the voltage endurance of the circuit elements. Please refer to FIG. 6, which is a third implementation of the battery system 100 shown in FIG. 1. The architecture of a balancing circuit 602 included in the battery system 600 is based on that of the balancing circuit 502 shown in FIG. 5, wherein the main difference is that the balancing circuit 602 further includes an energy adjustment circuit 642. The energy adjustment circuit 642 is coupled to the capacitors C_1-C_n, and is arranged for selectively adjusting the inductive energy EI stored in the capacitors C_1-C_n and providing the adjusted inductive energy EI for the battery units B_1-B_n.

Figure 6:
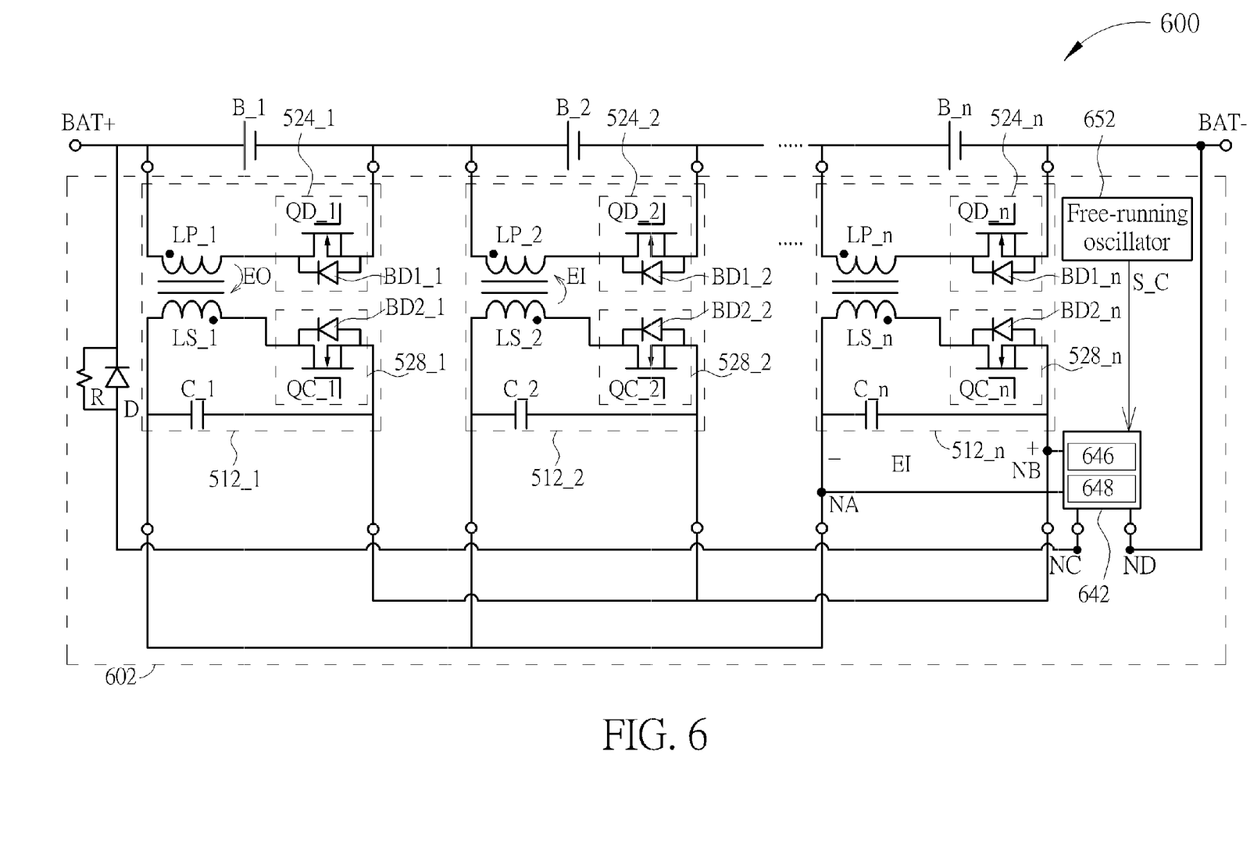
FIG. 6 is a third implementation of the battery system shown in FIG. 1.

In this implementation, when the inductive energy EI is low (e.g. voltages stored in the capacitors C_1-C_n are below 180 volts), the energy adjustment circuit 642 will not adjust the inductive energy EI. In other words, the battery balancing mechanisms of the balancing circuit 602 and the balancing circuit 502 shown in FIG. 5 are substantially identical/similar when the inductive energy EI is low. In a case where the balancing circuit 602 is employed in the high voltage battery system (i.e. the series-connected battery units B_1-B_n have a high rated voltage (the rated voltage between the node BAT+ and the node BAT-)), if the inductive energy EI is too high (e.g. over 180 volts), the energy adjustment circuit 642 may be arranged to perform a boost conversion upon the inductive energy EI (i.e. the energy adjustment circuit 642 may be a boost converter circuit or a flyback converter circuit), and provide the converted energy for the battery units B_1-B_n to thereby maintain the normal operation of the battery system.

Specifically, the energy adjustment circuit 642 may a first node NA, a second node NB, a third node NC and a fourth node ND. The first node NA and the second node NB are coupled to the two terminals of the capacitor C_n, respectively, and the third node NC and the fourth node ND are coupled to the node BAT+ and the node BAT-, respectively. Hence, the energy adjustment circuit 642 may receive the inductive energy EI through the first node NA and the second node NB, and output the adjusted energy EI through the third node NC and the fourth node ND.

Additionally, the energy adjustment circuit 642 may include a logic unit 646 and an adjustment unit 648. The logic unit 646 is arranged for determining if the inductive energy EI stored in the capacitors C_1-C_n achieves a predetermined amount of energy and accordingly generating a determination result. The adjustment unit 648 is coupled to the logic unit 646, and is arranged for adjusting the inductive energy EI according to the determination result. For example, the logic unit 646 may use "voltage threshold with a hysteresis" as the determination logic. When the determination result indicates that the inductive energy EI is beyond a hysteresis band, the adjustment unit 648 may adjust the inductive energy EI.

The balancing circuit 602 may further include a free-running oscillator 652, which is arranged for generating an oscillation signal S_C to control an energy adjustment of the energy adjustment circuit 642. In a case where the energy adjustment circuit 642 is a boost converter circuit, the energy adjustment circuit 642 may adjust an increment of the inductive energy EI according to the frequency and the duty cycle of the oscillation signal S_C. In addition, the design concept of the control unit 242 shown in FIG. 4 may be used to implement a control unit corresponding to the energy adjustment circuit 642 (not shown in FIG. 6).

Please note that the balancing circuit 602 may further include a plurality of energy adjustment circuits to thereby realize the modular design concept. For example, each balancing module shown in FIG. 6 may be coupled to an energy adjustment circuit (not shown in FIG. 6). In other words, each of the balancing modules 512_1-512_n may be coupled to a circuit identical/similar to the energy adjustment circuit 642. It should be noted that, in a case where the balancing circuit 602 includes a plurality of energy adjustment circuits, only one of the energy adjustment circuits needs to be activated in the aforementioned boost conversion.

To sum up, the proposed battery balancing circuit may balance a battery system rapidly, and have a modular architecture to simplify the circuit design and increase the design flexibility. Additionally, the proposed battery balancing circuit may use a free-running oscillator to simplify the control mechanism and reduce the cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A balancing circuit for balancing battery units, comprising:
   a plurality of balancing modules, coupled to the balancing units, respectively, wherein each balancing module comprises:
      a first switch unit;
      a second switch unit;
      a first inductive device, coupled between the first switch unit and a battery unit coupled to the balancing module; and
      a second inductive device, coupled to the second switch unit, wherein the first inductive device is coupled to the second inductive device;
   wherein the balancing modules comprises a first balancing module and a second balancing module, respectively coupled to a first battery unit and a second battery unit of the battery units; the first inductive device of the first balancing module takes away an excess energy of the first battery unit according to a switch state of the first switch unit of the first balancing module, and stores an inductive energy corresponding to the excess energy in the second balancing module; and the second inductive device of the second balancing module provides the inductive energy for the second battery unit according to a switch state of the second switch unit of the second balancing module.

2. The balancing circuit of claim 1, wherein the inductive energy is stored in second inductive devices of the balancing modules simultaneously.

3. The balancing circuit of claim 1, wherein the second inductive device of each balancing module is coupled between the second switch unit of each balancing module and the battery unit coupled to each balancing module; first inductive devices of the balancing modules are coupled to each other; and second inductive devices of the balancing modules are coupled to each other.

4. The balancing circuit of claim 3, wherein each of the first switch unit and the second switch unit is a unidirectional switch device.

5. The balancing circuit of claim 4, wherein the unidirectional switch device comprises:
   a diode; and
   a bidirectional switch device, coupled in series with the diode.

6. The balancing circuit of claim 3, wherein the second switch unit turns on before or at the same time as the first switch unit turns off.

7. The balancing circuit of claim 1, wherein each balancing module further comprises:
   an energy storage device, for storing the inductive energy, wherein two terminals of the energy storage device are coupled to the second inductive device and the second switch unit, respectively;
   wherein energy storage devices of the balancing modules are coupled in parallel.

8. The balancing circuit of claim 7, wherein the inductive energy is stored the energy storage devices of the balancing modules simultaneously.

9. The balancing circuit of claim 7, wherein the battery units are coupled in series between a high side terminal and a low side terminal, and the energy storage device is electrically connected between the high side terminal and the low side terminal.

10. The balancing circuit of claim 7, wherein the battery units are coupled in series between a high side terminal and a low side terminal, and the balancing circuit further comprises:
    an impeditive element, wherein the energy storage device is electrically connected to one of the high side terminal and the low side terminal through the impeditive element.

11. The balancing circuit of claim 7, wherein the battery units are coupled in series between a high side terminal and a low side terminal, and the balancing circuit further comprises:
    a diode, wherein the energy storage device is electrically connected to one of the high side terminal and the low side terminal through the diode.

12. The balancing circuit of claim 7, wherein the first switch unit and the second switch unit turn on simultaneously.

13. The balancing circuit of claim 7, further comprising:
    an energy adjustment circuit, coupled to the energy storage device, the energy adjustment circuit arranged for selectively adjusting the inductive energy and providing the adjusted inductive energy for the battery units.

14. The balancing circuit of claim 13, wherein the battery units are coupled in series between a high side terminal and a low side terminal; the energy adjustment circuit has a first node, a second node, a third node and a fourth node; the first node and the second node are coupled to the two terminals of the energy storage device, respectively; and the third node and the fourth node are coupled to the high side terminal and the low side terminal, respectively.

15. The balancing circuit of claim 13, wherein the energy adjustment circuit is a boost converter circuit.

16. The balancing circuit of claim 13, wherein the energy adjustment circuit comprises:
    a logic unit, for determining if the inductive energy stored in the energy storage device achieves a predetermined amount of energy and accordingly generating a determination result; and
    an adjustment unit, coupled to the logic unit, the adjustment unit arranged for adjusting the inductive energy according to the determination result.

17. The balancing circuit of claim 13, further comprising:
    a free-running oscillator, for generating an oscillation signal to control an energy adjustment of the energy adjustment circuit.

18. The balancing circuit of claim 1, further comprising:
    a control unit, having a free-running oscillator, wherein the free-running oscillator is arranged to generate an oscillation signal, and the control unit generates a driving signal according to the oscillation signal in order to control the switch state of at least one of the first switch unit and the second switch unit.

* * * * *